United States Patent [19]

Izawa et al.

[11] 4,228,064
[45] Oct. 14, 1980

[54] FLAME-RETARDANT POLYPHENYLENE ETHER RESIN COMPOSITION

[75] Inventors: Shinichi Izawa, Tokyo; Jun Sugiyama, Yokohama; Atsuo Nakanishi, Kanagawa, all of Japan

[73] Assignee: Asaki-Dow Limited, Tokyo, Japan

[21] Appl. No.: 86,145

[22] Filed: Oct. 18, 1979

Related U.S. Application Data

[62] Division of Ser. No. 837,629, Sep. 27, 1977, Pat. No. 4,198,492.

[30] Foreign Application Priority Data

Oct. 4, 1976 [JP] Japan ................ 51-118482

[51] Int. Cl.³ ............ C08K 5/52; C08K 5/53
[52] U.S. Cl. ............ 260/45.7 P; 260/45.7 PH; 260/45.7 PS; 260/45.8 R
[58] Field of Search ............ 260/45.8 R, 45.7 P, 260/45.7 PH, 45.7 PS

[56] References Cited

U.S. PATENT DOCUMENTS

| | | | |
|---|---|---|---|
| 2,916,510 | 12/1959 | Garner | 260/936 |
| 3,702,878 | 11/1972 | Saito | 260/45.8 R |
| 4,113,795 | 9/1978 | Izawa et al. | 260/45.8 R |

*Primary Examiner*—Morton Foelak
*Attorney, Agent, or Firm*—Cushman, Darby & Cushman

[57] ABSTRACT

A flame-retardant polyphenylene ether resin composition comprising (I) 85 to 97% by weight of a resin consisting of (1) 20 to 90% by weight of a polyphenylene ether of the formula (A):

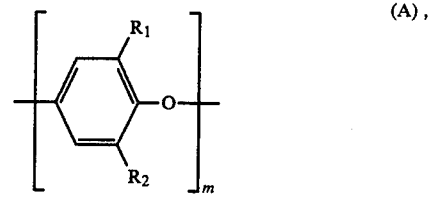

where $R_1$ and $R_2$ are each alkyl of 1 to 4 carbon atoms and m is the degree of polymerization, and (2) 80 to 10% by weight of a styrene type polymer and (II) 3 to 15% by weight of at least one member of the group consisting of phosphorus-containing compounds of formula (B):

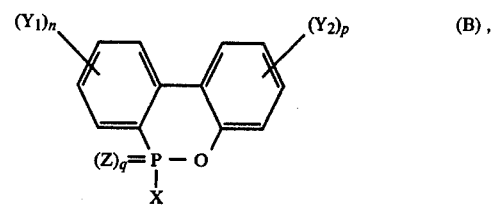

where X is a hydrogen atom, a hydroxyl group, an amino group, a halogen atom, an alkyl group of 1 to 10 carbon atoms, an alkoxy group of 1 to 10 carbon atoms, an alkylthio of 1 to 10 carbon atoms, an aryloxy of 6 of 10 carbon atoms or hydroxy substituted aryloxy of 6 to 10 carbon atoms, $Y_1$ and $Y_2$ are each an alkyl of 1 to 8 carbon atoms, an alkoxy of 1 to 8 carbon atoms or an aryl group, Z is an oxygen or sulfur atom, n and p are each an integer of 0 to 4 and q is an integer of 0 or 1. Similar compositions are also prepared including styrene type compounded grafted to the polyphenylene ether and including organic phosphates and organic phosphites and/or melamine, benzoguanamine or their methylol or etherified methylol derivatives.

17 Claims, No Drawings

FLAME-RETARDANT POLYPHENYLENE ETHER RESIN COMPOSITION

This is a division of application Ser. No. 837,629 filed Sept. 27, 1977, now U.S. Pat. No. 4,198,492.

BACKGROUND OF THE INVENTION

This invention relates to flame-retardant polyphenylene ether resin compositions. More particularly, this invention relates to a flame-retardant composition (I) produced by adding a styrene type polymer to a polyphenylene ether and mixing the resultant resin composition with a phosphorus-containing compound; a flame-retardant composition (II) produced by adding a styrene type polymer to a polyphenylene ether having a styrene type compound graft-copolymerized thereto and mixing the resultant resin composition with a novel organic phosphorus-containing compound; and a flame-retardant composition (III) produced by mixing said flame-retardant composition with at least one compound selected from the group consisting of (a) aromatic organophosphorous acid esters and (b) aromatic organophosphorous acid esters and triazole ring-containing compounds.

In recent years, polyphenylene ether resins have come to have great attention because they have excellent mechanical properties, electrical properties, chemical resistance and thermal resistance, exhibit low hydroscopicity and enjoy high dimensional stability. Further, since polyphenylene ethers possess excellent flame retarding properties, they are rated as self-extinguishing and non-dripping by ASTM Testing Method D-635 and specification No. 94 of Underwriters' Laboratories (hereinafter abbreviated as "UL-94"). Polyphenylene ethers, however, have long had poor fabricability, which constitutes their gravest defect. As means for improvement in this respect, there have been suggested a number of methods resorting to the addition of styrene type polymers. For example, Japanese Patent Publication No. 17812/1968, Japanese Patent Publication No. 32774/1973, U.S. Patent No. 3,383,435, etc., disclose compositions containing polyphenylene ethers blended with styrene type polymers. There have also been suggested a number of methods resorting to graft polymerization of styrene type compounds. For example, Japanese Patent Publication No. 1210/1972, U.S. Pat. No. 3,664,977, Japanese Laid-open Patent Publication No. 98446/1974, U.S. Pat. No. 3,929,931, U.S. Pat. No. 3,586,736, U.S. Pat. No. 3,664,977 and U.S. Pat. No. 3,929,931 disclose resin compositions having styrene type compounds graft copolymerized to polyphenylene ethers.

The resin compositions having the fabricability of polyphenylene ethers improved as disclosed by these prior patent publications, however, have the disadvantage that they do not make materials suitable in regard to flammability for a wide range of industrial uses because the styrene type polymers incorporated therein possess neither self-extinguishing properties nor non-dripping properties and, upon ignition, they are completely burnt out.

SUMMARY OF THE INVENTION

An object of the present invention is to provide polyphenylene ether resin compositions having both improved fabricability and flame-retardancy.

To be specific, this invention provides a flame-retardant composition (I) which substantially comprises (A) 85 to 97% by weight of a resin component consisting of (1) 20 to 90% by weight of a polyphenylene of the generic formula (A):

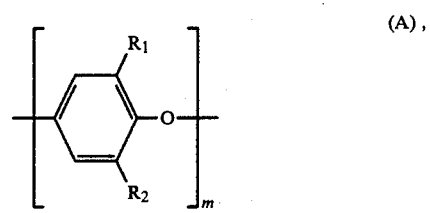

where $R_1$ and $R_2$ are each an alkyl of 1 to 4 carbon atoms and m is the degree of polymerization, and (2) 10 to 80% by weight, based on the resin component, of a styrene type polymer and (B) 3 to 15% by weight, based on the whole composition, of at least one compound selected from the group consisting of phosphorus-containing compounds of the generic formula (B):

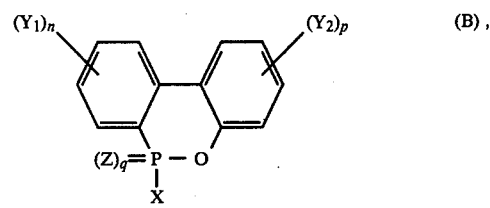

where X is a hydrogen atom, a hydroxyl, an amino, a halogen, an alkyl of 1 to 10 carbon atoms, an alkoxy of 1 to 10 carbon atoms, an alkylthio of 1 to 10 carbon atoms, an aryloxy of 6 to 10 carbon atoms or a hydroxyl-substituted aryloxy of 6 to 10 carbon atoms, $Y_1$ and $Y_2$ are each an alkyl of 1 to 8 carbon atoms or of 1 to 8 carbon atoms, or an aryl group, Z is an oxygen or sulfur atom, n and p are each an integer of from 0 to 4 and q is an integer of 0 or 1.

The present invention further relates to a flame-retardant composition (II) which substantially comprises 80 to 98% by weight of a resin component and 2 to 20% by weight of at least one compound selected from the group consisting of phosphorus-containing compounds of the generic formula (B):

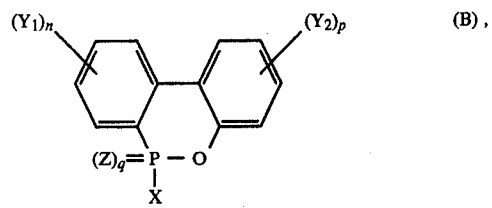

where X is a hydrogen atom, a hydroxyl, an amino, a halogen, an alkyl of 1 to 10 carbon atoms, an alkoxy of 1 to 10 carbon atoms, an alkylthio of 1 to 10 carbon atoms, an aryloxy of 6 to 10 carbon atoms or a hydroxyl-substituted aryloxy of 6 to 10 carbon atoms, $Y_1$ and $Y_2$ are each an alkyl of 1 to 8 carbon atoms, an alkoxyl of 1 to 8 carbon atoms or an aryl group, Z is an oxygen or sulfur atom, n and p are each an integer of from 0 to 4 and q is an integer of 0 or 1, said resin component comprising a styrene type compound grafted polyphenylene ether copolymer and a styrene type polymer and containing 20 to 80% by weight, based on the resin component, of a polyphenylene ether of the generic formula (A):

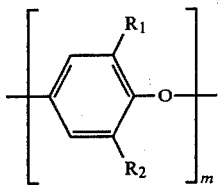

where $R_1$ and $R_2$ are each an alkyl of 1 to 4 carbon atoms and m is the degree of polymerization, said styrene type compound grafted polyphenylene ether copolymer having 20 to 200 parts by weight of a styrene type compound grafted onto 100 parts by weight of said polyphenylene ether. Furthermore, this invention provides a flame-retardant composition (III) which substantially comprises 80 to 98% by weight of a resin component, 1 to 18% by weight of at least one compound selected from the group consisting of phosphorus-containing compounds of the generic formula (B):

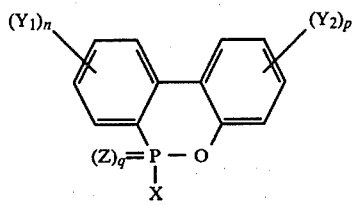

where X is a hydrogen atom, a hydroxyl, an amino, a halogen, an alkyl of 1 to 10 carbon atoms, an alkoxy of 1 to 10 carbon atoms, an alkylthio of 1 to 10 carbon atoms, an aryloxy of 6 to 10 carbon atoms or a hydroxyl-substituted aryloxy of 6 to 10 carbon atoms, $Y_1$ and $Y_2$ are each an alkyl of 1 to 8 carbon atoms, an alkoxy of 1 to 8 carbon atoms or an aryl group, Z is an oxygen or sulfur atom, n and p are each an integer of from 0 to 4 and q is an integer of 0 or 1, and 1 to 18% by weight each of at least one compound selected from the group consisting of aromatic organophosphoric acid esters, aromatic organophosphorous acid esters and triazine ring-containing compounds of the generic formula (C):

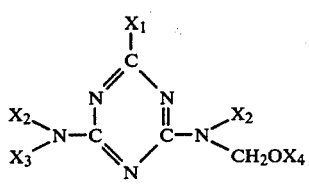

melamine or benzoguanamine where $X_1$ is a phenyl or

$X_2$ and $X_3$ are each a hydrogen atom or $CH_2OX_5$, $X_4$ and $X_5$ are each a hydrogen atom, $C_3$, $C_2H_5$, $C_3H_7$ or $C_4H_9$, said resin component comprising a styrene type compound grafted polyphenylene ether copolymer and a styrene type polymer and containing 20 to 80% by weight, based on the resin component, of a polyphenylene ether of the generic formula (A):

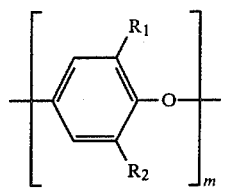

where $R_1$ and $R_2$ are each an alkyl of 1 to 4 carbon atoms and m is the degree of polymerization, said styrene type compound grafted polyphenylene ether copolymer having 20 to 200 parts by weight of a styrene type compound grafted onto 100 parts by weight of said polyphenylene ether.

Examples of the polyphenylene ethers to be used in flame-retardant compositions (I), (II) and (III) include poly(2,6-dimethylphenylene-1,4-ether), poly(2,6-diethylphenylene-1,4-ether), poly(2-methyl-6-ethylphenylene-1,4-ether), poly(2-methyl-6-propylphenylene-1,4-ether), poly(2,6-dipropylphenylene-1,4-ether), poly(2-ethyl-6-propylphenylene-1,4-ether), poly(2-methyl-6-butylphenylene-1,4-ether), poly(2,6-dibutylphenylene-1,4-ether) and poly(2-ethyl-6-butylphenylene-1,4-ether). The most advantageous polyphenylene ether for the purpose of the present invention is poly(2,6-dimethylphenylene-1,4-ether). This particular polymer excels in compatibility with styrene type polymers, permits resin compositions of varying proportions to be readily prepared and manifests an outstanding effect in imparting flame-retardancy due to its sunergism with the organic phosphorus compounds.

For the flame-retardant composition (I) of this invention to be effectively practiced, the number-average molecular weight of the polyphenylene ether is in the range of 6,000 to 30,000, preferably 7,000 to 25,000. Use of a polyphenylene ether having a number-average molecular weight of less than 6,000 is undesirable because of the polymer notably degrades the resultant resin composition in physical properties, particularly creep properties. Use of a polyphenylene ether having a higher molecular weight exceeding 30,000 is likewise undesirable because the polymer seriously degrades the resin composition in fabricability, causes degradation of the styrene type polymer and inhibits maintenance of balanced physical properties.

The term "styrene type compound" as used with respect to the flame-retardant composition (I) of this invention is meant to embrace polymers preponderantly comprising styrene type compounds whose number-average molecular weights fall in the range of from 50,000 to 200,000, preferably from 60,000 to 150,000. Concrete examples of styrene type compounds include styrene, α-methyl styrene, 2,4-dimethyl styrene, monochloro-styrene, dichloro-styrene, 2,4-dimethyl styrene, monochloro-styrene, dichloro-styrene, p-methyl styrene, p-tert.-butyl styrene and ethyl styrene and the like, e.g. lower alkyl styrenes and halostyrenes. At the time of polymerization, these styrene type compounds may be used in combination with copolymerizable vinyl compounds such as, for example, methyl methacrylate, acrylonitrile, methacrylonitrile, butyl acrylate and butadiene. The styrene type polymers, further, embrace generally known rubber-reinforced resins. For example, rubber-reinforced polystyrene resins, e.g., natural rubber or butadiene-acrylonitrile rubber reinforced polystyrene and acrylonitrile-butadiene-styrene copolymer resins are embraced therein. The proportion of the styrene type polymer to the whole resin component is in the range of from 10 to 80% by weight, preferably from 15 to 75% by weight. If the content of the styrene type polymer is less than the lower limit 10% by weight, the styrene type polymer fails to impart ample fabricability to the resultant resin composition. If the content exceeds the upper limit 80% by weight, the styrene type polymer may be unable, depending on the condition of mixture thereof with the phosphorus-containing compound of this invention, to confer desired flame-retardancy upon the resultant composition. If the number-average molecular weight of the styrene type polymer is below 50,000, there is the disadvantage that the physical properties of the resultant resin, particularly impact strength and creep properties, are deficient. If it exceeds 200,000, however, there ensues an adverse effect upon the moldability and fabricability, which results in various undesirable phenomena such as thermal deterioration of the composition at the time of fabrication and inferior impact resistance of the shaped article due to residual strain.

The expression "graft copolymer having a styrene type compound grafted onto a polyphenylene ether" as used in connection with the flame-retardant compositions (II) and (III) of this invention is meant to embrace those having 20 to 200 parts by weight of styrene type compound polymer graft polymerized onto 100 parts by weight of a polyphenylene ether of the generic formula (A):

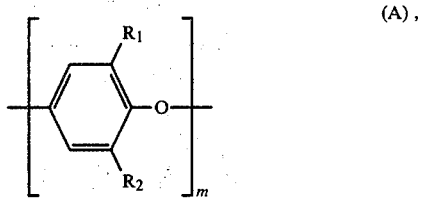

where $R_1$ and $R_2$ are each an alkyl of 1 to 4 carbon atoms and m is the degree of polymerization.

The preparation of this graft copolymer is accomplished as by a method touched upon in U.S. Pat. No. 3,929,930, for example.

The number-average degree of polymerization of the polyphenylene ether to be used in the preparation of the graft copolymer as one component of the flame-retardant composition (II) of the present invention is selected in the range of from 50 to 300, preferably from 70° to 250. If the number-average degree of polymerization of the polyphenylene ether is less than the lower limit of 50, the object of this invention cannot be attained because the graft copolymer cannot easily be obtained in a form perfectly free from residual homopolymer of the polyphenylene ether and the resin composition obtained as the final product exhibits undesirable properties. If there is used a polyphenylene ether in which the number-average degree of polymerization exceeds the upper limit of 300, an undesirable effect is manifested on the fluidity of the finally produced resin composition. In the extreme case, the resin composition is deprived of its fluidity to the extent of undergoing gelation.

In the polyphenylene ether having a styrene type compound graft polymerized thereto and used in the flame-retardant compositions (II) and (III) of the present invention, the term "styrene type compound" is meant to embrace styrene and styrene derivatives such as alkylated and halogenated styrene. Concrete examples of said styrene type compounds include styrene, α-methyl styrene, 2,4-dimethyl styrene, monochloro-styrene, dichloro-styrene, p-t-butyl styrene, p-methyl styrene, ethyl styrene and the like.

At the time of polymerization, these styrene type compounds may be used in combination with copolymerizable vinyl compounds such as, for example, methyl methacrylate, acrylonitrile, methacrylonitrile, butyl acrylate, butadiene and the like. Where desired, the graft copolymerization may be carried out in the presence of two or more styrene type compounds.

As regards the percentage composition of the graft copolymer to be used in the flame-retardant compositions (II) and (III) of the present invention, a graft copolymer having 20 to 200 parts by weight of a styrene type compound grafted onto 100 parts by weight of a polyphenylene ether is advantageously used. If the proportion of the styrene type compound is less than the lower limit of 20 parts by weight, it is difficult to substantially avoid survival of unaltered homopolymer of the polyphenylene ether. If the proportion exceeds the upper limit of 200 parts by weight, the characteristic of the present invention cannot be manifested to full advantage because the thermal resistance, tensile strength and other features due to the presence of the polyphenylene ether component are degraded.

The term "styrene type polymer" as used in connection with the flame-retardant compositions (II) and (III) is meant to embace polymers preponderantly comprising styrene type compounds of which the number-average molecular weights fall in the range of from 50,000 to 200,000, preferably from 60,000 to 150,000. The "styrene type compounds" referred to here are identical to those which are used in the aforementioned graft copolymerization. Such styrene type polymers further embrace generally known styrene type resins reinforced with rubber. For example, rubber-reinforced polystyrene resins (e.g., of the types mentioned above), acrylonitrile-butadiene-styrene copolymer resins, and the like are embraced in the styrene type polymers for use in the present invention. The proportion of the styrene type polymer (including the styrene type polymer chemically bound onto the polyphenylene ether in consequence of the graft copolymerization) to the whole resin component is in the range of 20 to 80% by weight, preferably from 25 to 75% by weight. If the content of the styrene type polymer is less than the lower limit of 20% by weight, the styrene type polymer fails to impart ample fabricability to the resultant composition. If the content is greater than the upper limit of 80% by weight, the styrene type polymer may be unable, depending upon the condition of mixture thereof with a flame-retarding agent such as an organic phosphorus compound of the present invention, to confer the desired flame-retardancy upon the resultant composition. If the number average molecular weight of the styrene type polymer is below 50,000, there is the disadvantage that the physical properties of the resultant resin, particularly impact strength and creep properties, are deficient. If it exceeds 200,000, however, there ensues an adverse effect upon the moldability and fabricability, which results in various undesirable phenomena such as thermal deterioration of the composition at the time of fabrication and inferior impact resistance of the shaped article due to residual strain.

Concrete examples of the phosphorus-containing compounds represented by the general formula (B) and used in the flame-retardant compositions (I), (II) and (III) of the present invention are shown below by structural formula.
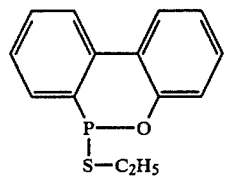
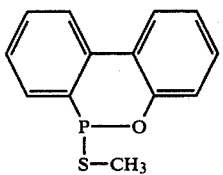
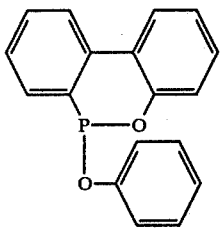
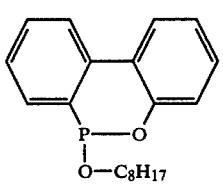
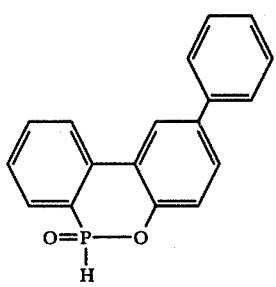
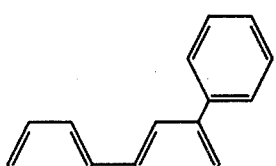
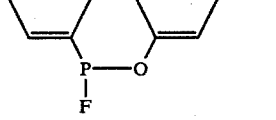
-continued
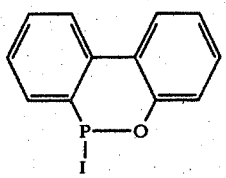
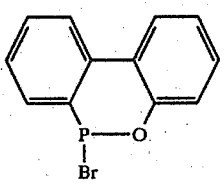
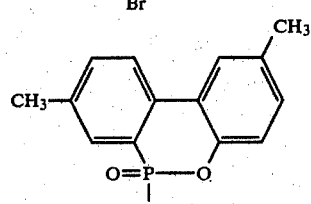
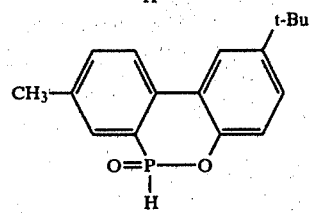
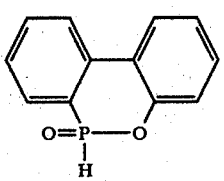
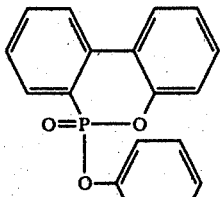
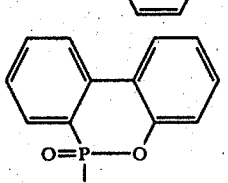
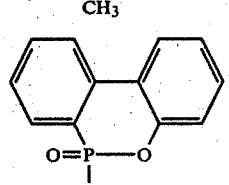
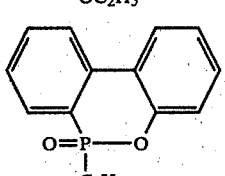

-continued
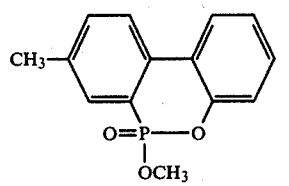
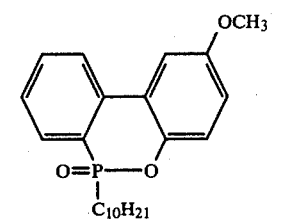
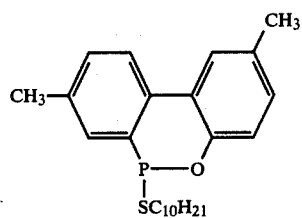
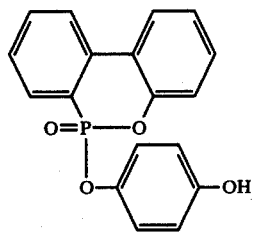
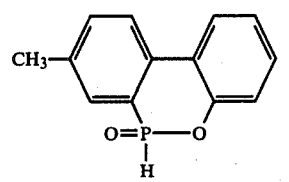
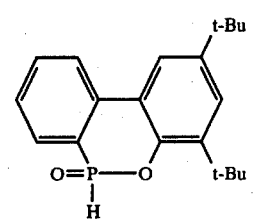
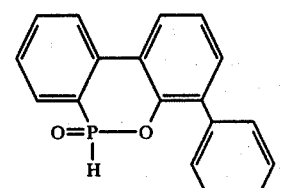
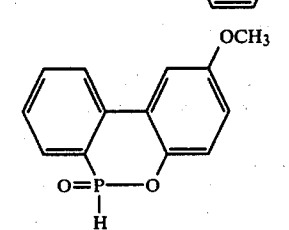
-continued
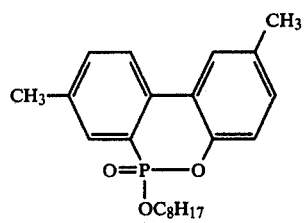
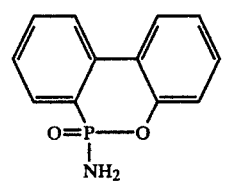
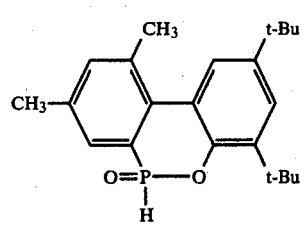
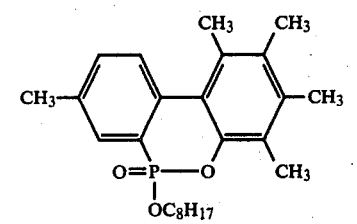
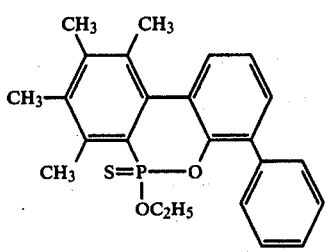
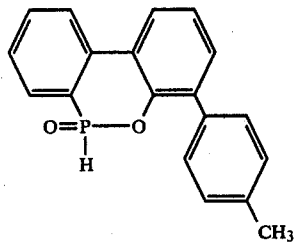
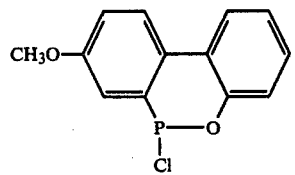

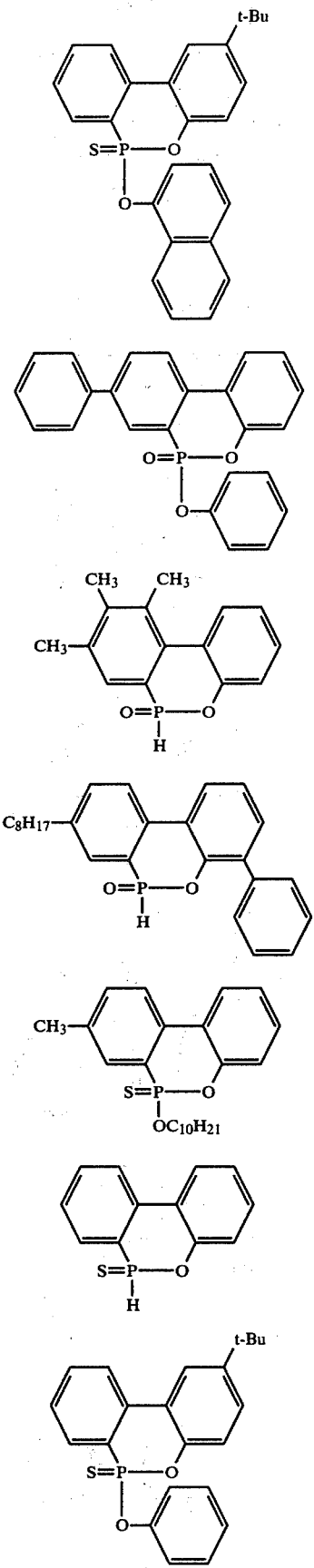
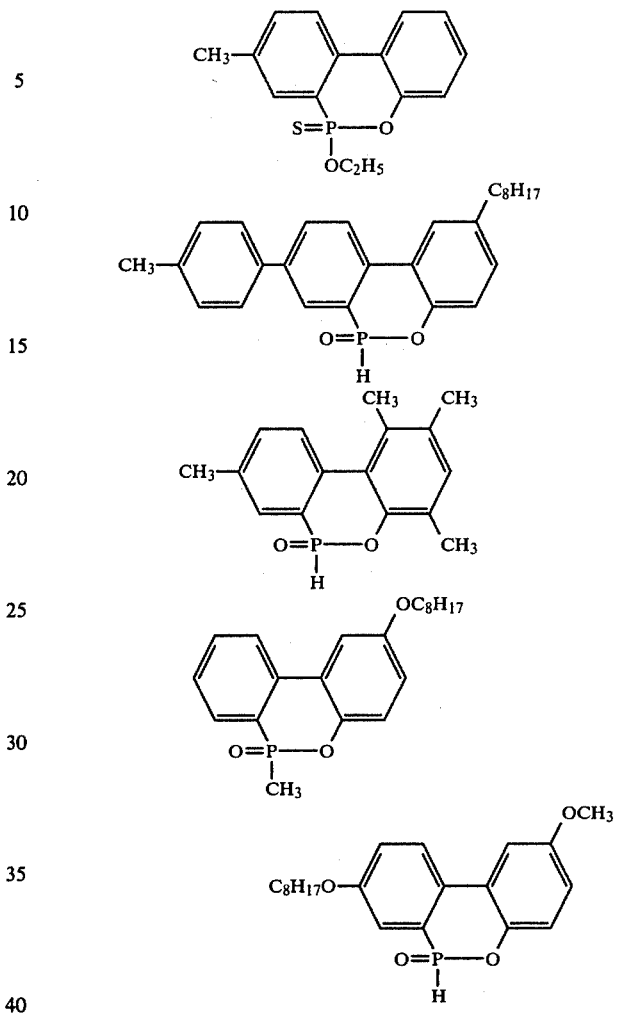

The phosphorus-containing compounds enumerated above are known to the art. A method for the manufacture of these phosphorus-containing compounds is disclosed in U.S. Pat. No. 3,702,878. For the effect of the present invention to be manifested advantageously, the content of the phosphorus-containing compound in the flame-retardant composition (I) is in the range of from 3 to 15% by weight, preferably from 5 to 12% by weight based on the whole composition. If the content of the phosphorus-containing compound is less than the lower limit of 3% by weight, the compound fails to impart self-extinguishing properties and non-dripping properties as found acceptable by the testing method UL-94 to the resultant composition. If the content exceeds the upper limit of 15% by weight, the compound fails to enable the resultant resin composition to retain its properties, particularly the temperature of deflection under load the impact strength, in the practical working ranges. Thus, any deflection of the content from said range proves to be undesirable.

Concrete examples of the aromatic organophosphoric acid esters and aromatic organophosphorous acid esters referred to with respect to the flame-retardant composition (III) of the present invention are tricresyl phosphate, triphenyl phosphate, trixylyl phosphate, cresyl diphenyl phosphate, xylyldiphenyl phosphite, octyl-diphenyl phosphate, triphenyl phosphate, tricresyl phosphite, trixylyl phosphite, tris (cyclohexyl-phenyl) phosphite, cresyl-diphenyl phosphite, xylyl-diphenylphosphite, and the like.

Concrete examples of the triazole ring-containing compounds as used in this invention include melamine, melamine having 1 to 6 N-H groups thereof methylolated, e.g., dimethylol melamine, trimethylol melamine and hexamethylol melamine, melamine having 1 to 6 N-H groups thereof methylolated and having the methylolated N-H groups further etherified partially or wholly, by methyl, ethyl, propyl or butyl alcohol, e.g., hexamethylol melamine hexamethyl ether, trimethylol melamine tributyl ether and tetramethylol melamine dimethyl ether, benzoguanamine, a benzoguanamine having 1 to 4 N-H groups thereof methylolated, e.g., monomethylol benzoguanamine, tetramethylol benzoguanamide, a benzoguanamine having 1 to 4 N-H groups thereof methylolated and having the methylolated N-H groups thereof methylolated and having the methylolated N-H groups further etherified partially or wholly by methyl, ethyl, butyl or propyl, e.g., tetramethylol guanamine tetramethyl ether and the like.

In flame-retardant composition (II) of the present invention, the content of the phosphorus-containing compound (B) is 2 to 20% by weight compared to 80 to 98% by weight of the resin component. In the flame-retardant composition (III), the content of heterocyclic phosphorus compound is 1 to 18% by weight compared to 80 to 98% by weight of the resin component. In the latter composition having the heterocyclic phosphorus-containing compound content of 1 to 18% by weight, there is additionally incorporated 1 to 18% by weight of at least one compound selected from the group consisting of aromatic organophosphoric acid esters and aromatic organophosphorous acid esters or 1 to 18% by weight of a triazole ring-containing compound (C). Otherwise, the composition can comprise 80 to 98% by weight of the resin component, 1 to 18% by weight of the phosphorus-containing compound, 1 to 18% by weight of either an aromatic organophosphoric acid ester or an aromatic organophosphorous acid ester and 1 to 18% by weight of a triazine ring-containing compound.

For the flame-retardant composition (III) of the present invention to manifest its effect to fully advantage, its total content of one or two flame-retarding agents selected from the group consisting of heterocyclic phosphorus-containing compounds, aromatic organophosphoric acid esters, aromatic organophosphorous acid esters and triazine ring-containing compounds is selected in the range of from 2 to 20% by weight, preferably from 3 to 18% by weight, based on the whole flame-retardant composition (III). If the content of the flame-retarding agent is less than the lower limit 2% by weight, the agent fails to impart the self-extinguishing properties and non-dripping properties to the resultant composition. If the content exceeds the upper limit 20% by weight, the agent fails to enable the resultant composition to retain the properties, particularly the temperature of deflexion under load and impact strength, within the practical working ranges.

The method used for the production of the flame-retardant composition (I), (II) or (III) of the present invention is not critical, i.e., the components may be mixed by any method effective for the purpose. One typical example of the methods advantageously available comprises the steps of thoroughly mixing the resin destined to form the backbone of the final composition with the phosphorus-containing compound and further with the flame-retarding agent comprising an aromatic organophosphoric acid ester, an aromatic organophosphorous acid ester and/or a triazine ring-containing compound in a dry blender, melting and kneading the mixture in an extruder and molding the molten mixture into pellets.

Needless to say, it is permissible to incorporate in the flame-retardant composition (I), (II) or (III) of the present invention other additives such as, for example, a plasticizer, a pigment, a reinforcing agent, a filler, an extender and a stabilizer as occasion demands.

Now, the present invention will be described more specifically with reference to examples thereof. Whenever there are mentioned parts and percents, they always mean parts by weight and percents by weight.

The composition can comprise, consist essentially of or consist of the materials set forth.

DESCRIPTION OF THE PREFERRED EMBODIMENTS

EXAMPLE 1

In a blender, 40 parts of poly(2,6-dimethylphenylene-1,4-ether) having a number-average molecular weight of 18,000, 60 parts of a rubber-reinforced styrene-acrylonitrile copolymer having an average acrylonitrile content of 5% and a styrenebutadiene copolymer rubber content of 10% and 8 parts of a phosphorus-containing compound of the following formula:

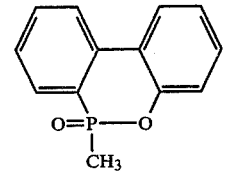

were thoroughly mixed. The resultant mixture was melted and kneaded in an extruder maintained at 220° to 280° C. to produce pellets. The resin mixture thus obtained was capable of being injection molded under the conditions of 250° C. and 600 kg/cm². The physical properties it was found to possess were tensile strength 460 kg/cm² (by ASTM method D638, which method was also employed in the examples hereinafter), 12.5 kg.cm/cm Izod impact strength (by ASTM method D256, which method was also employed in the examples hereinafter) and 91.5° C. temperature of deflection under load (by ASTM method D-648, which method was also employed in the examples hereinafter). The resin mixture of this example was tested for inflammability by the UL-94 method. The ignition time was found to be at most 9.2 seconds and 1.6 seconds on the average. In the creep test under tension which was performed at 23° C. under a load of 210 kg, the amount of creep after 1,000 hours of test was 1.04%.

EXAMPLE 2

In a blender, 50 parts of poly(2,6-dimethylphenylene-1,4-ether) having a number-average molecular weight of 21,000, 50 parts of a rubber-reinforced polystyrene containing 8% of polybutadiene and 8 parts of a phosphorus-containing compound of the following formula:

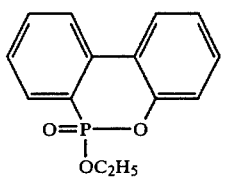

were thoroughly mixed. The resultant mixture was melted and kneaded in an extruder maintained at 280° C. to produce pellets. The resin mixture thus obtained was capable of being injection molded under the conditions of 260° C. and 650 kg/cm². The properties it was found to possess were 560 kg/cm² tensile strength, 9.7 kg.cm/cm Izod impact strength and 100.5° C. temperature of deflection under load. In the test for inflammability by the method of UL-94 method, the ignition time was found to be at most 5.0 seconds and 1.8 seconds on the average. Thus, the product was in the V-O grade. In the creep test under tension which was performed at 60° C. under a load of 105 kg in one test run and at 23° C. under a load of 210 kg in another test run the amounts of creep after 1,000 hours were 0.68% and 0.98% respectively.

EXAMPLE 3

In an extruder maintained at 220° to 280° C., a resin component consisting of 60 parts of poly(2,6-dimethylphenylene-1,4-ether) having a number-average molecular weight of 9,500, 20 parts of a polystyrene-grafted polybutadiene containing 50% of polybutadiene and 20 parts of a polystyrene having a number-average molecular weight of 105,000 was melted and blended to form pellets. In a blender, 100 parts of the pellets and 6 parts of a phosphorus-containing compound of the following formula:

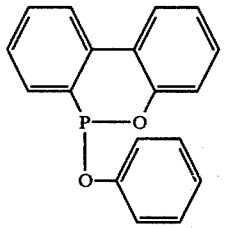

were thoroughly mixed. The resultant mixture was melted and kneaded in an extruder maintained at 200° to 260° C. The resin composition thus obtained was capable of being injection molded under the conditions of 280° C. and 600 kg/cm². The properties it was found to possess were 620 kg/cm² tensile strength, 18.5 kg.cm/cm Izod impact strength and 112° C. of temperature of deflection under load. In the test for inflammability by the method of UL-94 method, the ignition time was found to be at most 4.9 seconds and 2.7 seconds on the average. Thus, the product was in the V-O grade. In the creep test under tension which was performed at 60° C. under a load of 105 kg in one test run and at 23° C. under a load of 210 kg in a second test, the amounts of creep after 1,000 hours were 0.46% and 0.83% respectively.

EXAMPLE 4

In a blender, 100 parts of the resin mixture pellets obtained in Example 3 and 5 parts of a phosphorus-containing compound of the following formula:

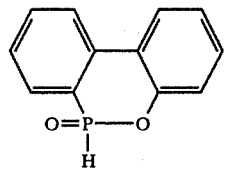

were thoroughly mixed. Then the mixture was melted and kneaded in an extruder. The resin composition thus obtained was capable of being injection molded under the conditions of 280° C. and 550 kg/cm². The physical properties it was found to possess were 590 kg/cm² tensile strength, 11.8 kg.cm/cm Izod impact strength and 109.5° C. temperature of deflection under load. In the test for inflmmability by the method of UL-94 method, the ignition time was at most 7.4 seconds and 3.1 seconds on the average. The product, thus, was in the V-O grade. In the creep test under tension which was performed at 60° C. under a load of 105 kg, the amount of creep after 1,000 hours was 0.58%.

EXAMPLE 5

In a Brabender, 100 parts of the resin mixture pellets obtained in Example 3 and 5 parts of a phosphorus-containing compound the following formula:

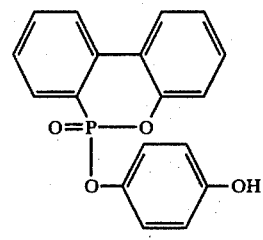

were melted and kneaded at 250° C. for 20 minutes. The resin composition consequently obtained was shown to have a melt index of 3.3 g/10 min. (at 250° C. under a load of 10 kg by the ASTM method D1238, which method was also employed in the examples hereinafter). The physical properties it was found to possess were 580 kg/cm² of tensile strength, 12.3 kg·cm/mc of Izod impact strength and 111° C. of temperature of deflection under load. In the test for inflammability by the method of UL-94 method, the ignition time was at most 9.5 seconds and 4.3 seconds on the average. Thus, the product was in the V-O grade. In the creep test under tension which was performed at 60° C. under a load of 105 kg, the amount of creep after 1,000 hours was 0.66%.

EXAMPLE 6

In a blender, 100 parts of the resin mixture pellets obtained in Example 3 and 5 parts of a phosphorus-containing compound of the following formula:

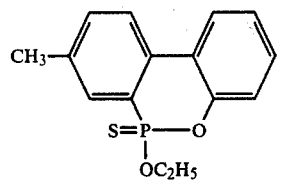

were thoroughly mixed. Then, the mixture was melted and kneaded in an extruder maintained at 220° to 260° C. The resin composition thus obtained was capable of being injection molded under the conditions of 280° C. and 600 kg/cm². The physical properties it was found to possess were 600 kg/cm² tensile strength, 14.5 kg·cm/cm Izod impact strength and 115° C. temperature of deflection under load. In the test for inflammability by the UL-94 method, the ignition time was at most 8.6 seconds and 4.1 seconds on the average. Thus, the product was in the V-O grade. In the creep test under tension which was performed at 60° C. under a load of 105 kg in one test run and at 23° C. under a load of 210 kg in another test run, the amounts of creep after 1,000 hours were 0.39% and 0.79% respectively.

EXAMPLE 7

In a blender, 80 parts of poly(2,6-dimethylphenylene-1,4-ether) having a number-average molecular weight of 13,000, 12 parts of a polystyrene grafted polybutadiene containing 50% of polybutadiene, 8 parts of a polystyrene having a number-average molecular weight of 120,000 and 12 parts of a phosphorus-containing compound of the following formula:

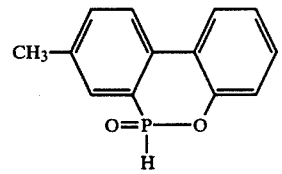

were thoroughly mixed. Then, the mixture was melted and kneaded in an extruder maintained at 230° to 290° C. to produce pellets. The resultant resin mixture composition was capable of being injection molded under the conditions of 280° C. and 750 kg/cm². The physical properties it was found to possess were 710 kg/cm² tensile strength, 15.5 kg·cm/cm Izod impact strength, 143° C. temperature of deflection under load and 1.4 g/10 min. melt index. In the test for inflammability by the UL-94 method, the ignition time was at most 2.1 seconds and 0.8 seconds on the average. Thus, the product was in the V-O grade. In the creep test under tension which was performed at 60° C. under a load of 105 kg, the amount of creep after 1,000 hours was 0.33%.

EXAMPLE 8

In a blender, 25 parts of poly(2,6-dimethylphenylene-1,4-ether) having a number-average molecular weight of 8,800, 60 parts of a polystyrene having a number-average molecular weight of 105,000 and 10 parts of a phosphorus-containing compound of the following formula:

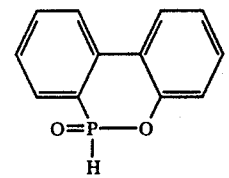

were mixed. Then, the mixture was melted and kneaded in an extruder maintained at 200° to 240° C. Then, in an extruder kept at 200° to 240° C., 95 parts of the resultant composition and 15 parts of a polystryene grafted polybutadiene containing 50% of polybutadiene were melted and kneaded. The resin composition thus obtained was capable of being injection molded under the conditions of 240° C. and 500 kg/cm². The physical properties it was found to possess were 380 kg/cm² tensile strength, 22.6 kg·cm/cm Izod impact strength and 86.3° C. temperature of deflection under load. In the test for inflammability by the UL-94 method, the ignition time was at most 11.3 seconds and 4.9 seconds on the average. Thus, the product was in the V-1 grade. In the creep test under tension which was performed at 23° C. under a load of 210 kg, the amount of creep after 1,000 hours was 1.19%.

EXAMPLE 9

In a blender, 20 parts of poly(2,6-dimethylphenylene-1,4-ether) having a number-average molecular weight of 16,500, 80 parts of a rubber-reinforced polystyrene containing 9.6% of polybutadiene and 8 parts of a phosphorus-containing compound of the following formula:

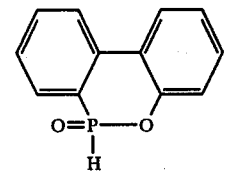

were thoroughly mixed. The mixture was then melted and kneaded in an extruder maintained at 190° to 230° C. The resin thus obtained was capable of being injection molded under the conditions of 235° C. and 500 kg/cm². The physical properties it was found to possess were 365 kg/cm² tensile strength, 19.5 kg·cm/cm Izod impact strength and 86.3° C. temperture of deflection under load. In the test for inflammability by the UL-94 method, the ignition time was at most 16.9 seconds and 9.8 seconds on the average. Thus, the product was in the V-1 grade. In the creep test under tension which was performed at 23° C. under a load of 210 kg, the amount of creep after 1,000 hours was 1.25%.

EXAMPLE 10

There were uniformly dissolved in 220 parts of toluene by agitation at 100° C. for 30 minutes, 75 parts of poly(2,6-dimethylphenylene-1,4-ether) having a number-average molecular weight of 12,500 and 3.5 parts of a phosphorus-containing compound of the following formula:

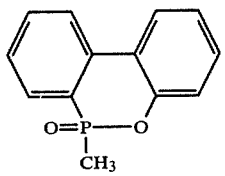

Under normal pressure, toluene was distilled out of the mixture. The remaining mixture was dried at 120° C. under 15 mm Hg for three hours. In a Brabender, 78.5 parts of the resultant dry polymer and 25 parts of a polystryene grafted polybutadiene containing 30% of polybutadiene were melted and kneaded at 270° for 15 minutes. The resultant resin composition was shown to have a melt index of 1.1 g/10 min. The physical properties it was found to possess were 720 kg/cm² tensile strength, 23.5 kg·cm/cm Izod impact strength and 132.5° C. temperature of deflection under load. In the test for inflammability by the method of UL-94 method, the ignition time was 11.9 seconds at most and 6.4 seconds on the average. Thus, the product was in the V-1 grade. In the creep test under tension which was performed at 60° C. under a load of 105 kg, the amount of creep after 1,000 hours was 0.45%.

EXAMPLES 11–15

There were melted and kneaded in an extruder, 30 parts of poly(2,6-dimethylphenylene-1,4-ether) having a number-average molecular weight of 9,000 and 70 parts of a rubber-reinforced polystyrene containing 8.5% of polybutadiene were melted and kneaded, to form pellets. In a Brabender, 100 parts of the pellets and a varying amount (3 to 11 parts) of a phosphorus-containing compound of the following formula:

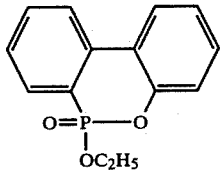

were kneaded at 240° C. for 20 minutes, to produce compression-molded test pieces. The varying test pieces thus obtained were subjected to test for inflammability by the UL-64 method.

Table 1

| Example | 11 | 12 | 13 | 14 | 15 |
|---|---|---|---|---|---|
| Content of phosphorus-containing compound (%) | 3 | 5 | 7 | 9 | 11 |
| Ignition time (seconds) Maximum | 26.1 | 18.0 | 9.7 | 4.1 | 2.5 |
| Average | 17.7 | 8.5 | 4.9 | 2.2 | 1.2 |
| Grade of inflammability by UL-94 | V-1 | V-1 | V-0 | V-0 | V-0 |

Comparison Examples 1–3

A mixture consisting of 15 parts of poly(2,6-dimethylphenylene-1,4-ether) having a number-average molecular weight of 16,500 and 85 parts of a rubber-reinforced polystyrene containing 9.6% of polybutadiene was melted and kneaded with a varying amount (6 to 12 parts) of a phosphorus-containing compound of the following formula:

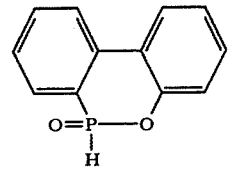

and the resultant mixture was compression molded. The resin compositions thus obtained were tested for inflammability by the method of UL-94 method. The results are collectively shown in Table 2.

Table 2

| Comparison Example | 1 | 2 | 3 |
|---|---|---|---|
| Content of phosphorus-containing compound (%) | 6 | 9 | 12 |
| Ignition time (seconds) Maximum | 41.5 | 22.5 | 10.8 |
| Average | 26.5 | 14.0 | 6.2 |
| Dripping property | YES | YES | YES |
| Grade of inflammability by UL-94 | — | V-2 | V-2 |

Comparison Example 4

The procedure of Example 2 was repeated, except the amount of the phosphorus-containing compound was decreased to 2.5 parts. The resultant resin mixture was capable of being injection molded under the conditions of 280° C. and 650 kg/cm². The physical properties it was found to possess were 590 kg/cm² tensile strength, 6.3 kg·cm/cm Izod impact strength and 113° C. temperature of deflection under load. In the test for inflammability by the method of UL-94 method, the ignition time was at most 38.6 seconds and 20.9 seconds on the average. Thus, the product was not of flame-retardant grade.

Comparison Examples 5–7

The procedure of Example 2 was repeated, except the amount of the phosphorus-containing compound was increased to 20 parts (in Comparison Example 5). It was further repeated, except the amount of the poly(2,6-dimethylphenylene-1,4-ether) in 100 parts of the resin component was increased to 65 parts in one test run and to 80 parts in the others (Comparison Examples 6 and 7). The resultant resin compositions were injection molded and then tested for physical properties and inflammability. The results are collectively shown in Table 3. The results indicate that an excess of the content of the phosphorus-containing compound brings about the disadvantage that the final resin composition suffers from serious degradation in impact strength and temperature of deflection under load even to a point where the phenomenon of dripping occurred during the combustion.

Table 3

| Comparison Example | 5 | 6 | 7 |
|---|---|---|---|
| Content of polyphenylene ether (parts) | 50 | 65 | 80 |
| Izod impact strength (kg.cm/cm) | 3.8 | 2.4 | 2.1 |
| Temperature of deflection uner load (°C.) | 58.5 | 71.0 | 81.5 |
| Ignition time (seconds) Maximum | 3.5 | 2.0 | 1.0 |
| Average | 1.9 | 0.8 | 0.5 |
| Dripping property | YES | YES | YES |

Comparison Example 8

The procedure of Example 7 was repeated, except the amount of the polyphenylene ether in 100 parts of the resin component was increased to 93 parts. The resultant mixture resin failed to affort any satisfactory injection-molded test piece even under the conditions of 300° C. and 900 kg/cm$^2$. The physical properties obtained of the compression-molded test piece were 750 kg/cm$^2$ tensile strength, 2.5 kg·cm/cm Izod impact strength, 155° C. temperature of deflection under load and 0.2 g/10 min. melt index. The results indicate that an excess of the content of the polyphenylene ether is disadvantageous.

EXAMPLE 16

In an autoclave, 50 parts of poly(2,6-dimethylphenylene-1,4-ether) having a number-average molecular weight of 11,000, 20 parts of styrene and 30 parts of ethyl benzene were uniformly dissolved by agitation under heating at 100° C. for one hour. To the resultant mixture was added a mixed solution consisting of 20 parts of ethyl benzene and 2 parts of di-tert.-butyl peroxide, followed by displacement of the oxygen gas present in the autoclave with nitrogen gas. The temperature of the resultant mixture in the autoclave was gradually elevated to 140° to 145° C., at which temperature the mixture was kept under agitation for 2.5 hours to induce a reaction. This treatment brought the polymerization of styrene to substantial completion. The reaction mixture was removed from the autoclave, dried in a vacuum drier at 200° C. for two hours to expel the solvent. Thus there was obtained a graft copolymer.

By assay of the graft copolymer through infrared absorption spectrometry, the copolymer was found to have a polystyrene content of 27%.

Separately, a rubber latex containing 50 parts of polybutadiene was agitated with a mixed solution consisting of 60 parts of styrene, 0.3 part of tert.-dodecylmercaptan, 0.5 part of sodium laurylsulfate, 0.05 part of potassium persulfate and 400 parts of deionized water at 70° C. for eight hours to induce polymerization. The latex thus obtained was salted out, washed and dried to afford a polymer, i.e. a rubber-modified polystyrene, in the form of flakes. By assay through infrared absorption spectrometry, the polymer was found to have a polybutadiene content of 47%.

In a blender, 60 parts of said polyphenylene ether graft copolymer, 16 parts of said rubber-modified polystyrene, 17 parts of polystyrene (sold by Asahi-Dow Ltd. under tradename of Styron 683) and 7 parts of a phosphorus-containing compound of the following formula:

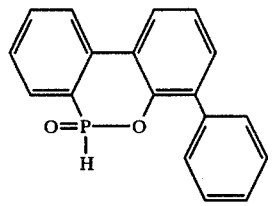

were thoroughly mixed. The resultant mixture was melted and kneaded in an extruder maintained at 220° to 280° C., to form pellets.

In the preparation of test pieces for determination of physical properties by use of an injection molding machine, Model IS50A, made by Toshiba Machine Co., Ltd. (the same molding conditions were employed in examples hereinafter), the resin mixture thus obtained was capable of being injection molded under the conditions of 235° C. and 450 kg/cm$^2$. The physical properties possessed by the resin were 510 kg/cm$^2$ tensile strength, 28% elongation at rupture, 12.5 kg·cm/cm Izod impact strength and 108° C. temperature of deflection under load. The resin had a smooth surface. The resin mixture of this Example was tested for imflammability by the UL-94 method. The ignition time was at most 6.1 seconds and 1.6 seconds on the average.

EXAMPLE 17

In a blender, 30 parts of the polyphenylene ether graft copolymer used in Example 16, 59 parts of the rubber-reinforced polystyrene (sold by Asahi-Dow Ltd. under tradename of Styron 492) and 11 parts of a phosphorus-containing compound of the following formula:

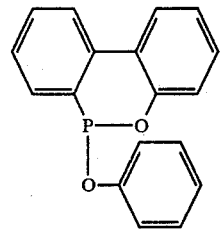

were mixed. Then, the mixture was melted and kneaded in an extruder maintained at 210° to 220° C., to form a resin mixture composition in the form of pellets. This resin was capable of being injection molded under the conditions of 215° C. and 400 kg/cm$^2$. It exhibited a tensile strength of 320 kg/cm$^2$, an Izod impact strength of 10.8 kg·cm/cm, a temperature of deflection under load of 85° C. and an ignition time of at most 9.8 seconds and 2.9 seconds on the average.

EXAMPLE 18

In a blender, a resin component consisting of 50 parts of the polyphenylene ether graft copolymer used in Example 16, 8 parts of a rubber-modified polystyrene and 31 parts of Styron 492 was mixed with a flame-retarding agent consisting of 3 parts of a phosphorus-containing compound of the following formula:

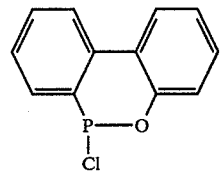

3 parts of tetramethylolated melamine and 5 parts of tricresyl phosphate. The resultant mixture was melted and kneaded in an extruder, to form pellets. The resin was capable of being injection molded under the conditions of 230° C. and 400 kg/cm$^2$. The physical properties possessed by the resin were 420 kg/cm$^2$ tensile strength, 32% elongation at rupture, 9.3 kg.cm/cm Izod impact strength and 102° C. temperature of deflection under load. In the test for inflammability, the ignition time was at most 4.2 seconds and 1.5 seconds on the average.

EXAMPLE 19

In a blender, 65 parts of the polyphenylene ether graft copolymer used in Example 16, 15 parts of rubber-modified polystyrene, 10 parts of Styron 690, 2 parts of a phosphorus-containing compound of the following formula:

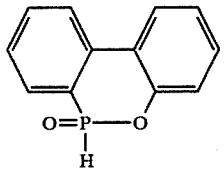

and 6 parts of triphenyl phosphate were mixed. The resultant mixture was melted and kneaded in an extruder. The resin thus obtained was capable of being injection molded under the conditions of 240° C. and 450 kg/cm². The physical properties possessed by this resin were 580 kg/cm² tensile strength, 50% elongation at rupture, 23.0 kg·cm/cm Izod impact strength and 112° C. temperature of deflection under load. In the test for inflammability, the ignition time was at most 8.8 seconds and 3.5 seconds on the average. Thus, this product was in the V-O grade.

EXAMPLE 20

A polyphenylene ether graft copolymer was obtained by following the procedure of Example 16, except there were used 30 parts of poly(2,6-dimethylphenylene-1,4-ether) having a number-average molecular weight of 21,000 and 40 parts of styrene. By the assay through the infrared absorption spectrometry, the copolymer was found to have a polystyrene content of 56%.

In a blender, 50 parts of the graft copolymer, 10 parts of the rubber-modified polystyrene used in Example 16, 30 parts of Styron 492, 3 parts of the heterocyclic phosphorus-containing compound used in Example 19, 2 parts of dimethylolated bezoguanamine and 5 parts of triphenyl phosphate were mixed. The resultant mixture was melted and kneaded in an extruder. The mixture resin thus obtained was capable of being injection molded under the conditions of 225° C. and 400 kg/cm². The physical properties possessed by the resin were 380 kg/cm² tensile strength, 35% elongation at rupture, 13.3 kg·cm/cm Izod impact strength and 83° C. temperature of deflection under load. In the test for inflammability, the ignition time was at most 3.5 seconds and 1.2 seconds on the average.

EXAMPLE 21

In a blender, 45 parts of the polyphenylene ether graft copolymer used in Example 20, 6 parts of the rubber-modified polystyrene used in Example 16, 40 parts of Styron 492, 2.5 parts of a phosphorus-containing compound of the following formula:

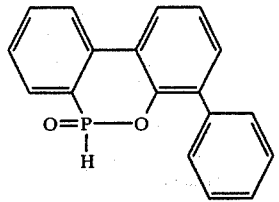

and 6.5 parts of 75% butylated tetramethylol benzoguanamine were mixed. Then, the resultant mixture was melted and kneaded in an extruder. The resin thus obtained was capable of being injection molded under the conditions of 220° C. and 450 kg/cm². The physical properties possessed by this resin were 340 kg/cm² tensile strength, 30% elongation at rupture, 11.9 kg·cm/cm Izod impact strength and 101° C. temperature of deflection under load. In the test for inflammability, the ignition time was at most 18.4 seconds and 9.3 seconds on the average.

EXAMPLE 22

In a blender, 70 parts of the polyphenylene ether graft copolymer used in Example 20, 14 parts of the rubber-modified polystyrene used in Example 16 and 16 parts of the heterocyclic phosphorus-containing compound used in Example 19 were mixed. Then the resultant mixture was heated and kneaded in an extruder. The resin mixture thus obtained was capable of being injection molded under the conditions of 210° C. and 300 kg/cm². The physical properties possessed by this resin were 410 kg/cm² tensile strength, 26% elongation at rupture, 9.0 kg·cm/cm Izod impact strength and 80° C. temperature of deflection under load. In the test for inflammability, the ignition time was at most 3.0 seconds and 1.0 second on the average.

EXAMPLE 23

In a blender, 90 parts of the polyphenylene ether graft copolymer used in Example 20, 7.8 parts of the rubber-modified polystyrene used in Example 16, 1.2 parts of a phosphorus-containing compound of the formula:

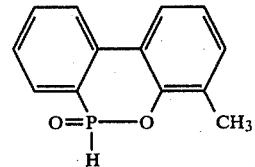

and 1.0 part of trixylyl phosphate were mixed. Then, the resultant mixture was melted and kneaded in an extruder. The resin mixture thus obtained was capable of being injection molded under the conditions of 240° C. and 450 kg/cm². The physical properties possessed by this resin were 540 kg/cm² tensile strength, 20% elongation at rupture, 6.9 kg·cm/cm Izod impact strength and 116° C. temperature of deflection under load. In the test for inflammability, the ignition time was at most 16.6 seconds and 5.8 seconds on the average.

EXAMPLE 24

In a blender, 60 parts of the polyphenylene ether graft copolymer used in Example 16, 15 parts of a rubber-modified polystyrene, 20 parts of the polyphenylene ether graft copolymer used in Example 20, 3 parts of the heterocyclic phosphorus-containing compound used in Example 19 and 2 parts of trimethylolated melamine were mixed. Then, the resultant mixture was melted and kneaded in an extruder. The resin thus obtained was capable of being injection molded under the conditions of 240° C. and 500 kg/cm². The physical properties possessed by this resin were 550 kg/cm² tensile strength, 42% elongation at rupture, 16.0 kg·cm/cm Izod impact strength and 131° C. temperature of deflection under load. In the test for inflammability, the ignition time was at most 10.3 seconds and 4.2 seconds on the average.

EXAMPLE 25

A mixture consisting of 70 parts of the poly(2,6-dimethylphenylene-1,4-ether) used in Example 16 and 15 parts of pulverized polystyrene (sold by Asahi-Dow Ltd. under tradename of Styron 683) and a mixed solution consisting of 2.0 parts of di-tert.-butyl peroxide and 15 parts of styrene were mixed to produce a homogeneous mixture. This mixture was fed to an extruder maintained at 150° to 230° C., in which it was melted and kneaded to undergo graft polymerization. As a result, there was obtained a polyphenylene ether graft copolymer. By assay through infrared absorption spectrometry, this graft copolymer was found to have a polystyrene content of 28%. In a blender, 85 parts of the graft copolymer, 10 parts of the rubber-modified polystyrene used in Example 16, 2 parts of the heterocyclic phosphorus-containing compound used in Example 19, 1 part of dimethylolated melamine and 2 parts of tricresyl phosphate were mixed. Then the resultant mixture was melted and kneaded in an extruder maintained at 220° to 270° C. The resin mixture thus obtained was capable of being injection molded under the conditions of 240° C. and 500 kg/cm². The physical properties possessed by this resin were 570 kg/cm² tensile strength, 35% elongation at rupture, 7.7 kg.cm/cm Izod impact strength and 139° C. temperature of deflection under load. In the test for inflammability, the ignition time was at most 12.2 seconds and 5.6 seconds on the average.

EXAMPLE 26

In a blender, a resin component consisting of 60 parts of the polyphenylene ether graft copolymer used in Example 25, 14 parts of Styron 492 and 10 parts of the rubber-modified polystyrene used in Example 16 and a flame-retarding agent consisting of 2 parts of the phosphorus-containing compound used in Example 16, 13 parts of hexamethoxymethylol melamine (sold by Sumitomo Chemical Co., Ltd. under tradename of Sumimarl M-100) and 1 part of triphenyl phosphate were simultaneously mixed. Then, the resultant mixture was melted and kneaded in an extruder. The resin thus obtained was capable of being injection molded under the conditions of 235° C. and 400 kg/cm². The physical properties possessed by this resin were 510 kg/cm² tensile strength, 22% elongation at rupture, 10.5 kg·cm/cm Izod impact strength and 120° C. temperature of deflection under load. In the test for inflammability, the ignition time was at most 9.6 seconds and 3.6 seconds on the average.

EXAMPLE 27

In a blender, 75 parts of the polyphenylene ether graft copolymer used in Example 25, 9.8 parts of the rubber-modified polystyrene used in Example 16, 1.2 parts of the heterocyclic phosphorus-containing compound used in Example 23 and 14 parts of trixylyl phosphate were mixed. Then, the resultant mixture was heated and kneaded in an extruder. The resin mixture thus obtained was capable of being injection molded under the conditions of 220° C. and 400 kg/cm². The physical properties possessed by this resin were 490 kg/cm² tensile strength, 26% elongation at rupture, 13.3 kg·cm/cm Izod impact strength and 98.5° C. temperature of deflection under load. In the test for inflammability, the ignition time was at most 6.1 seconds and 2.8 seconds on the average.

EXAMPLE 28

In a blender, 45 parts of the polyphenylene ether graft copolymer used in Example 25, 38.5 parts of Styron 492, 1.5 parts of the heterocyclic phosphorus-containing compound used in Example 19 and 15 parts of tetramethoxymethylol benzoguanamine were mixed. Then, the resultant mixture was melted and kneaded in an extruder. The resin thus obtained was capable of being injection molded under the conditions of 220° C. and 400 kg/cm². The physical properties possessed by this resin were 380 kg/cm² tensile strength, 30% elongation at rupture, 8.8 kg·cm/cm Izod impact strength and 111° C. temperature of deflection under load. In the test for inflammability, the ignition time was at most 19.5 seconds and 8.2 seconds on the average.

EXAMPLE 29

In a blender, 80.5 parts of the polyphenylene ether graft copolymer used in Example 25, 10 parts of the rubber-modified polystyrene used in Example 16, 8 parts of the heterocyclic phosphorus-containing compound used in Example 19 and 1.5 parts of pentamethylolated melamine were mixed. Then, the resultant mixture was melted and kneaded in an extruder. The resin mixture composition thus obtained was capable of being injection molded under the conditions of 230° C. and 400 kg/cm². The physical properties possessed by this resin were 560 kg/cm² tensile strength, 40% elongation at rupture, 9.8 kg·cm/cm Izod impact strength and 125° C. temperature of deflection under load. In the test for inflammability, the ignition time was at most 8.2 seconds and 3.3 seconds on the average.

EXAMPLE 30

A mixture consisting of 30 parts of the polyphenylene ether graft copolymer used in Example 16 and 20 parts of the polyphenylene ether graft copolymer used in Example 25 was mixed with 40 parts of Styron 492 to produce a resin component. In a blender, this resin component was thoroughly mixed with a flame-retarding agent consisting of 1 part of a phosphorus-containing compound of the following formula:

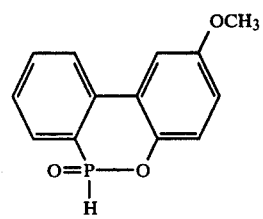

8 parts of tetramethylolated benzoguanamine and 1 part of cresyldiphenyl phosphate. Then, the resultant mixture was melted and kneaded in an extruder. The resin mixture composition thus obtained was capable of being injection molded under the conditions of 220° C. and 450 kg/cm². The physical properties possessed by this resin composition were 420 kg/cm² tensile strength, 20% elongation at rupture, 6.6 kg·cm/cm Izod impact strength and 112° C. temperature of deflection under load. In the test for inflammability, the ignition time was at most 14.3 seconds and 6.0 seconds on the average.

EXAMPLE 31

In an autoclave, 50 parts of poly(2,6-dimethylphenylene-1,4-ether) having a number-average molecular weight of 12,000, 18 parts of styrene, 2 parts of acrylonitrile and 30 parts of ethyl benzene were agitated under heating at 100° C. for one hour to provide a homogeneous solution. To the resultant mixture there was added a mixed solution consisting of 20 parts of ethyl benzene and 2 parts of di-tert.-butyl peroxide, followed by displacement of the oxygen gas present in the autoclave interior with nitrogen gas. The temperature of the resultant mixture in the autoclave was gradually elevated to 140° to 150° C., at which temperature the mixture was agitated for two hours to induce a reaction. By this treatment, polymerization of styrene and acrylonitrile was brought to substantial completion. The polymerization product was removed from the autoclave and, dried in a vacuum drier to afford a graft copolymer. By assay through infrared absorption spectrometry, the graft copolymer was found to have a polyphenylene ether content of 73%.

In a blender, 55 parts of the graft copolymer mentioned above, 45 parts of a rubber-modified styrene-acrylonitrile copolymer having an average acrylonitrile content of 13% and a styrene-butadiene copolymer rubber content of 14%, 4 parts of the heterocyclic phosphorus-containing compound used in Example 19 and 3 parts of tricresyl phosphate were mixed. Then, the resultant mixture was melted and kneaded in an extruder. The resin mixture composition thus obtained was capable of being injection molded under the conditions of 230° C. and 450 kg/cm² to produce shaped articles of a homogeneous texture. The physical properties possessed by this resin were 450 kg/cm² tensile strength, 40% elongation at rupture, 14.9 kg·cm/cm Izod impact strength and 104° C. temperature of deflection under load. In the test for inflammability, the ignition time was at most 9.6 seconds and 4.2 seconds on the average.

EXAMPLE 32

In a blender, 28 parts of the polyphenylene ether graft copolymer used in Example 31, 22 parts of a rubber-reinforced styrene-acrylonitrile copolymer having an average acrylonitrile content of 18% and a styrene-butadiene copolymer rubber content of 10%, 50 parts of Styron 492, 5 parts of the phosphorus-containing compound used in Example 16 and 2 parts of triphenyl phosphate were mixed. Then, the resultant mixture was melted and kneaded in an extruder. The mixture resin composition thus obtained was capable of being injection molded under the conditions of 220° C. and 400 kg/cm² to afford shaped articles of a homogeneous texture. The physical properties possessed by this composition were 330 kg/cm² tensile strength, 35% elongation at rupture, 15.5 kg·cm/cm Izod impact strength and 90.5° C. temperature of deflection under load. In the test for inflammability, the ignition time was at most 8.5 seconds and 4.6 seconds on the average.

EXAMPLE 33

A mixture consisting of 60 parts of poly(2,6-dimethylphenylene-1,4-ether) having a number-average molecular weight of 12,500, 10 parts of a pulverized polystyrene (sold by Asahi-Dow Ltd. under tradename of Styron 690) and 20 parts of ethylene-methyl methacrylate copolymer having a methyl methacrylate content of 12 mol% was mixed with a mixed solution consisting of 2.0 parts of di-tert.-butyl peroxide and 10 parts of styrene to provide a homogeneous solution. The resultant mixture was fed to an extruder maintained at 160° to 220° C., in which the mixture was melted and kneaded to induce graft polymerization. As a result, there was obtained a polyphenylene-ether graft copolymer. By assay through infrared absorption spectrometry, the graft copolymer was found to have a polystyrene content of 19% and an ethylene-methyl methacrylate copolymer content of 20%. In a blender, 75 parts of the graft copolymer mentioned above, 18 parts of Styron 690, 5 parts of the heterocyclic phosphorus-containing compound used in Example 19 and 2 parts of tricresyl phosphate were thoroughly mixed. Then, the resultant mixture was melted and kneaded in an extruder. The resin mixture composition thus obtained was capable of being injection molded under the conditions of 240° C. and 450 kg/cm² to afford shaped articles of a homogeneous texture. The physical properties possessed by this composition were 440 kg/cm² tensile strength, 50% elongation at rupture, 18.2 kg·cm/cm Izod impact strength and 110° C. temperature of deflection under load. In the test for inflammability, the ignition time was at most 11.5 seconds and 4.9 seconds on the average.

What is claimed is:

1. A flame-retardant polyphenylene ether resin composition comprising (A) 85 to 97% by weight of a resin consisting of (1) 20 to 90% by weight of a polyphenylene ether of the generic formula (A):

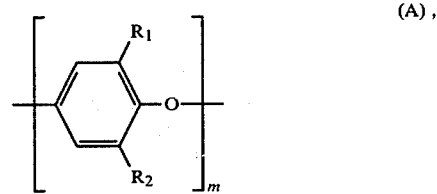

where $R_1$ and $R_2$ are each an alkyl of 1 to 4 carbon atoms and m is the degree of polymerization, and (2) 10 to 80% by weight of a styrene type polymer, and (B) 3 to 15% by weight of at least one member selected from the group consisting of phosphorus-containing compounds of the generic formula (B):

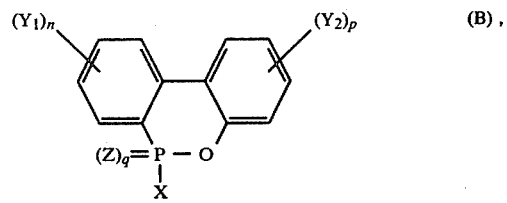

where X is a hydrogen atom, a hydroxyl, an amino, a halogen, an alkyl of 1 to 10 carbon atoms, an alkoxy of 1 to 10 carbon atoms, an alkylthio of 1 to 10 carbon atoms, an aryloxy of 6 to 10 carbon atoms or a hydroxyl-substituted aryloxy of 6 to 10 carbon atoms, $Y_1$ and $Y_2$ are each an alkyl of 1 to 8 carbon atoms, an alkoxy of 1 to 8 carbon atoms or an aryl group, Z is an oxygen or sulfur atom, n and p are each an integer of 0 to 4 and q is an integer of 0 or 1.

2. The composition according to claim 1, wherein the phosphorus-containing compound is a compound of the formula:

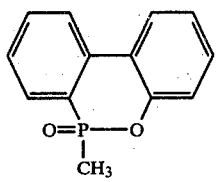

3. The composition according to claim 1, wherein the phosphorus-containing compound is a compound of the formula:

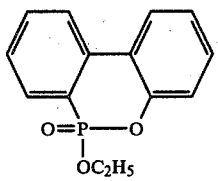

4. The composition according to claim 1, wherein the phosphorus-containing compound is a compound of the formula:

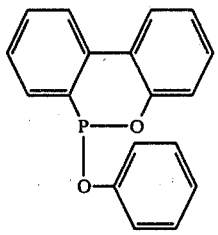

5. The composition according to claim 1, wherein the phosphorus-containing compound is a compound of the formula:

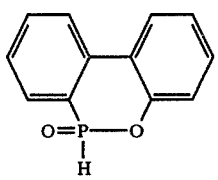

6. The composition according to claim 1, wherein the phosphorus-containing compound is a compound of the formula:

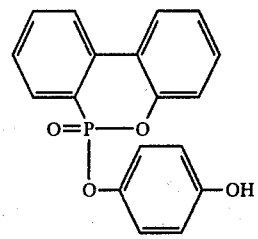

7. The composition according to claim 1, wherein the phosphorus-containing compound is a compound of the formula:

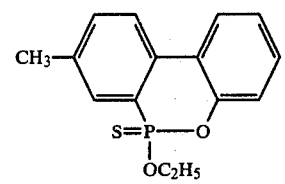

8. The composition according to claim 1, wherein the phosphorus-containing compound is a compound of the formula:

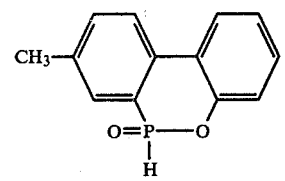

9. The composition according to claim 1, wherein the polyphenylene ether is a compound of the generic formula:

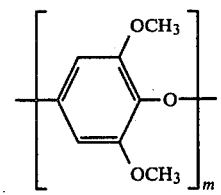

10. The composition according to claim 1, wherein the styrene type polymer is polystyrene reinforced with a conjugated diene rubber.

11. A flame-retardant polyphenylene ether resin composition comprising (A) 80 to 98% by weight of a resin component and (B) 2 to 20% by weight of at least one compound selected from the group consisting of phosphorus-containing compounds of the generic formula (B):

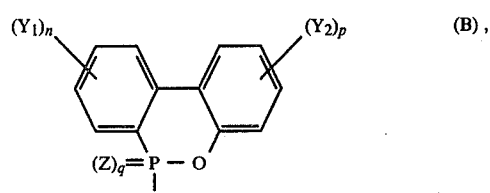

where X is a hydrogen atom, a hydroxyl, an amino, a halogen, an alkyl of 1 to 10 carbon atoms, an alkoxy of 1 to 10 carbon atoms, an alkylthio of 1 to 10 carbon atoms, an aryloxy of 6 to 10 carbon atoms or a hydroxyl-substituted aryloxy of 6 to 10 carbon atoms, $Y_1$ and $Y_2$ are each an alkyl of 1 to 8 carbon atoms, an alkoxy of 1 to 8 carbon atoms or aryl group, Z is an oxygen or sulfur atom, n and p are each an integer of the value of from 0 to 4 and q is an integer of the value of 0 or 1, said resin component comprising (1) a styrene type compound grafted polyphenylene ether copolymer and (2) a styrene type polymer and containing 20 to 80% by weight, based on the resin component, of a polyphenylene ether of the generic formula (A):

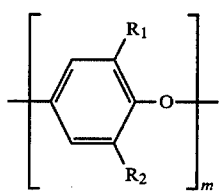

(A), where $R_1$ and $R_2$ are each an alkyl of 1 to 4 carbon atoms and m is the degree of polymerization, said styrene type compound grafted polyphenylene ether copolymer having 20 to 200 parts by weight of a styrene type compound grafted onto 100 parts by weight of said polyphenylene ether.

12. The composition according to claim 11, wherein the phosphorus-containing compound is a compound of the formula:

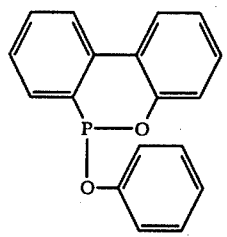

13. The composition according to claim 11, wherein the phosphorus-containing compound is a compound of the formula:

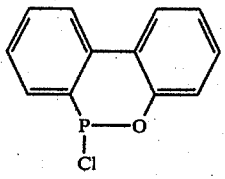

14. The composition according to claim 11, wherein the phosphorus-containing compound is a compound of the formula:

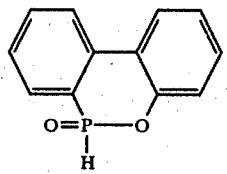

15. The composition according to claim 11, wherein the phosphorus-containing compound is a compound of the formula:

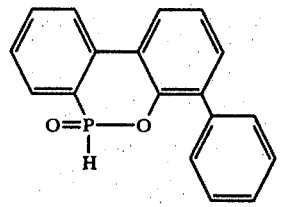

16. The composition according to claim 11, wherein the polyphenylene ether is a compound of the generic formula:

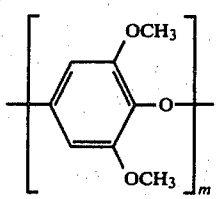

17. The composition according to claim 11, wherein the styrene type polymer is a polystyrene reinforced with a conjugated rubber.

* * * * *